United States Patent [19]

Livingston

[11] 4,423,779
[45] Jan. 3, 1984

[54] OIL RECOVERY SYSTEM AND PROCESS

[76] Inventor: Arnold M. Livingston, 50 Division Ave., Millington, N.J. 07946

[21] Appl. No.: 318,177

[22] Filed: Nov. 4, 1981

[51] Int. Cl.³ .................. E21B 43/24; E21B 43/40
[52] U.S. Cl. ................................ 166/250; 166/57; 166/64; 166/266; 166/272
[58] Field of Search ............... 166/57, 64, 303, 272, 166/252, 250, 268, 266, 267

[56] References Cited

U.S. PATENT DOCUMENTS

| | | | |
|---|---|---|---|
| 1,602,190 | 10/1926 | Eddy et al. | 166/267 |
| 2,742,089 | 4/1956 | Morse et al. | 166/273 |
| 3,096,819 | 7/1963 | White, Jr. et al. | 166/309 |
| 3,364,994 | 1/1968 | Sterrett | 166/263 |
| 4,008,764 | 2/1977 | Allen | 166/272 X |
| 4,109,720 | 8/1978 | Allen et al. | 166/272 X |
| 4,113,017 | 9/1978 | Hitzman | 166/303 |
| 4,271,905 | 6/1981 | Redford et al. | 166/303 X |
| 4,344,488 | 8/1982 | Marks | 166/303 |
| 4,362,213 | 12/1982 | Tabor | 166/303 X |

Primary Examiner—Stephen J. Novosad
Attorney, Agent, or Firm—Sughrue, Mion, Zinn, Macpeak & Seas

[57] ABSTRACT

A process and apparatus for recovering oil from an oil-bearing formation which comprises the steps of injecting into the oil-bearing formation a heated aerosol fog of organic chemicals which are soluble in oil, the fog preferably being at an elevated temperature and pressure. The heated aerosol fog penetrates the formation dissolving caked oil and oil trapped within the formation thereby increasing its permeability. The dissolved oil is extracted from the formation along with the injected chemicals and the chemicals are thereafter separated from the oil.

15 Claims, 1 Drawing Figure

OIL RECOVERY SYSTEM AND PROCESS

BACKGROUND OF THE INVENTION

1. Field of the Invention

The present invention relates to a process for recovering oil from an oil bearing formation.

2. Description of the Prior Art

Ordinarily in recovering oil, after a consistent valuable, natural flow has ceased, the formation may be subjected to a variety of secondary or tertiary recovery techniques. In some such procedures, steam is used to heat the oil in the oil bearing formation, thereby increasing its mobility, and to create pressure which tends to force the oil out of the formation. Flooding of the formations with water and detergent containing compositions has also been employed. The use of steam or water in recovering oil requires a substantial source of fresh water having a low solids content. This requirement poses particular problems in areas where only small quantities of fresh water are available or where brine is produced in oil recovery operations. Saline waters have an excessively high solids content and corrode oil field equipment.

Another problem commonly encountered with the use of steam or water is that many oil bearing formations contain clays or clay-like materials. Many of these materials swell on contact with water, especially fresh water, which dramatically reduces the permeability of the formation to oil flow by swelling and restricting the physical size of flow channels therein or by migrating and collecting in local areas to form bridges or blocks in pores in the formation.

SUMMARY OF THE INVENTION

It is an object of the present invention to provide an additional process for recovering oil that may be useful alone or in conjunction with other established procedures such as steam injection, flooding, etc.

Specifically, in accordance with the present invention, a heated aerosol fog of very fine droplets of organic materials including one or more oil soluble chemicals are injected into an oil-bearing formation. The organic, oil soluble materials are injected into the formation in the form of a heated aerosol fog. The fog may be produced at the site by a suitable aerosol fog generator. The droplets penetrate the formation dissolving caked oil and oil trapped within or around rocks thereby loosening the oil and increasing the permeability of the formation. The oil soluble chemical is separated from the recovered oil after removal of the mixture from the formation. In some cases it may be advantageous to pump the fog under pressure into the formation.

DESCRIPTION OF THE PREFERRED EMBODIMENTS

Figure 1:
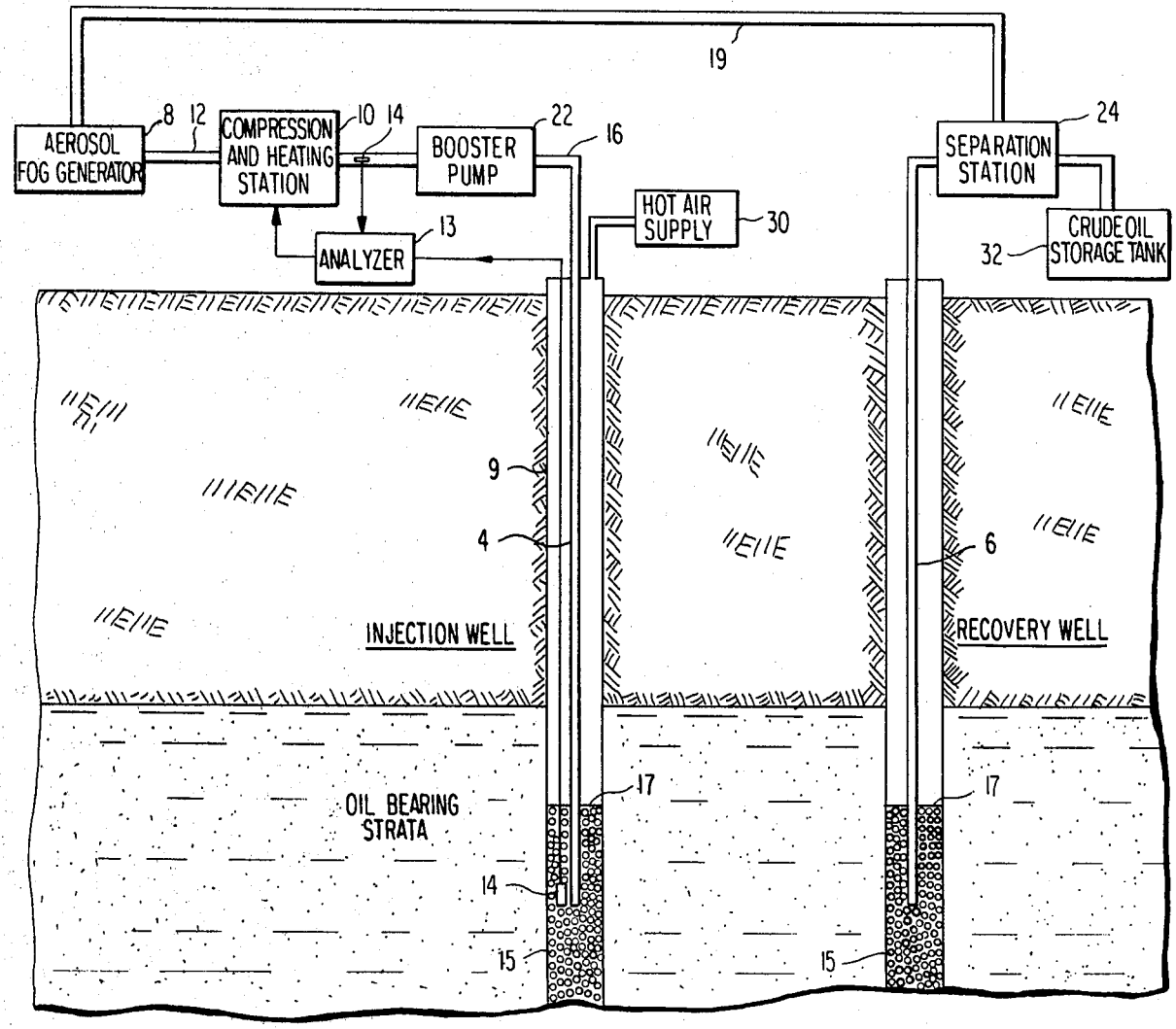
FIG. 1 is a schematic side view of a generalized illustration of an oil bearing formation showing a first embodiment of the present invention.

In accordance with the present invention, a thermal aerosol fog generator machine 8 produces an aerosol fog of very fine droplets of oil-soluble organic injection chemicals with travel through a pipe 12 to a compression and heating station 10 controlled by a probe 14. The probe comprises a pyrometer and a thermocouple which determine the temperature of the fog at the outlet of the heating and compression station 10 as well as the outlet of a downwell pipe 4. From the compression and heating station 10, the droplets are injected into a tube 16 and a downwell pipe 4 under pressure into the oil bearing formation 2. The downwell pipe 4 is surrounded by a second larger downwell pipe 9.

Feedback signals produced by the pyrometer and the thermocouple are directed to an analyzer 13 which is connected to the compression and heating station 10 in order to accurately control the temperature and pressure of the fog so that an optimum temperature and pressure exists at the outlet of the downwell pipe 4. When the downwell pipe is long, a separate booster pump 22 may be useful. The bottom section of the larger downwell pipe 9 has a plurality of holes or orifices 15 through which the fog is dispersed into the formation 2 after exiting the smaller downwell pipe 4. A sealing ring 17 surrounds the downwell pipe 4 at a point above the holes 15 in the larger downwell pipe 9 to prevent the fog from flowing upwards along the outside perimeter of the downwell pipe 4 away from the formation.

The droplets contain one or more oil soluble chemicals which are capable of penetrating into and dissolved caked or trapped oil in the formation 2 increasing the mobility of the oil and the permeability of the formation. Various chemicals can be used in forming the droplets which are capable of penetrating caked oil. Methyl alcohol, acetone, ethylene dichloride, perchlorethylene, methylated napthatene, #2 fuel oil, and kerosene are typical suitable chemicals. Combinations of the chemicals can also be used, the optimum combination being determined on a case-by-case basis depending upon the requirements of the substructure of the formation. However, good results are expected using a mixture of alcohol and benzene.

The diameter of the droplets formed by the aerosol fog generator machine 8 ranges between $0.5\mu$ and $60\mu$, the exact size also being determined by the particular requirements of the substructure of the formation 2. Machines capable of generating heated aerosol fogs of the above chemicals and droplet particle size are commercially available.

Core samples can be taken from the formation 2 to a laboratory to determine the optimum chemical to be used and the optimum particle size of aerosol fog. Other factors such as the substructure of the formation as well as the size of the formation should also be considered. The pressure of the droplets exiting the compression and heating station 10 can be very low, for example 25 psi, or higher depending on the depth of the downwell pipe 4 and other factors. On the other hand, utilizing a relatively large pressure, for example 100 psi, may allow the fog to penetrate long distances into normally inaccessible areas of the formations. The temperature of the fog exiting the station 10 should be between 500° F., and 2,500° F. the optimum temperature depending upon such factors as the chemicals used and the depth of the downwell pipe 4.

Before injecting the fog of injection chemicals into the downwell pipe 4, the downwell pipe 4 is preferably preheated with hot air from a hot air supply 30 thereby minimizing the cooling of the fog as it flows down the pipe 4, and also minimizing the formation of precipitation of the droplets in the pipe 4.

The heated fog of injection chemicals is injected into the oil bearing formation 2 until quantities of a mixture of formation oil and injected chemicals begin to flow up an upwell pipe 6. At this time, the injection of oil droplets may be discontinued. The oil droplets introduced into the formation 2 penetrate cracks and crevices and flush oil from porous strata in the formation substructure and dissolve oil retained in rocks and oil in other remote areas thereby increasing the flow of oil from the formation 2.

The upwell pipe 6 is again surrounded by a second larger upwell pipe 11 and the bottom section of the larger upwell pipe 11 contains a plurality of holes or orifices similar to those in the bottom section of the larger downwell pipe 9 for retrieving the fog and oil. A sealing rim 17 similar to the one in the downwell pipes 4, 9 is also used in the upwell pipes 6, 11.

The amount of fog used depends upon the characteristics of the substructure of the formation. Generally, fogging should be conducted for at least one hour or more depending on the depth of the downwell pipe 4 and the amount of penetration of the fog. Although fog can be injected into the formation 2 at periodic intervals when the amount of oil flowing from the formation through the upwell pipe 6 diminishes. The injection chemicals can be recovered by separating them from the tertiary oil pumped by the upwell pipe 6 by a separation station 24. The recovered chemicals can then be recycled back to the aerosol fog generator 8 via pipe 19 and the recovered oil can be stored in a crude oil storage tank 32.

In practice, a plurality of downwell pipes 4 and a plurality of upwell pipes 6 are inserted into the formation and are arranged in a pattern for recovering the oil from the formation.

The process may be useful in conjunction with other recovery techniques as a means to improve the mobility of oil in the formation and to increase the permeability of the formation thereby increasing the effectiveness of the other recovery procedures.

What is claimed:

1. A process for recovering oil from an oil bearing formation, comprising the steps of:
   (a) injecting fine droplets of oil soluble chemicals as an aerosol fog of at least 500° F. of said chemicals into said oil-bearing formation through a downwell pipe, said droplets penetrating said formation dissolving said oil contained therein increasing said formation's permeability; and
   (b) extracting said oil-soluble chemicals and any admixed or dissolved oil from said formation.

2. The process of claim 1 further comprising the step of preheating said downwell pipe with hot air prior to injecting said chemicals into said pipe.

3. The process of claim 2 wherein said chemicals are selected from the group consisting of methyl alcohol, acetone, ethylene dichloride, perchlorethylene, methylated napthatene, #2 fuel oil, and kerosene.

4. The process of claim 3 further comprising the step of separating said chemicals from any admixed or dissolved oil.

5. The process of claim 2 wherein said chemicals are alcohol and benzene.

6. The process of claim 2 further comprising the step of controlling the temperature and pressure of said fog for optimum penetration of said formation.

7. The process of claim 6 wherein said temperature and pressure of said fog is controlled by a probe and an analyzer, said probe comprising a thermocouple and a pyrometer which produce feedback signals for controlling said temperature and pressure of said fog to maintain said temperature and pressure of said fog at optimum levels for oil recovery, said optimum temperature being between 500° F. and 2,500° F.

8. The process of claim 2 wherein the size of said fine droplets range between 0.5 $\mu$m and 60 $\mu$m.

9. An apparatus for recovering oil from an oil bearing formation, comprising:
   a thermal fog machine for producing an aerosol fog of droplets of an oil-soluble chemical of at least 500° F. for penetrating and dissolving said oil in said oil bearing formation;
   means for injecting said fog into said formation; and
   means for recovering said chemicals and any admixed or dissolved oil from said formation.

10. The apparatus of claim 9 further comprising:
    means for heating and compressing said fog;
    means for detecting the temperature and pressure of said fog at the outlet of said fog from said heating and compressing means and at an outlet of said fog from said injector means; and
    means responsive to said detection means for controlling said heating and compression means to maintain the temperature and pressure of said fog at optimum levels for oil recovery.

11. The apparatus of claim 10 wherein said injector means comprises a pump for pumping said fog and a downwell pipe for transporting said fog to said oil bearing formation.

12. The apparatus of claim 11 wherein said downwell pipe is preheated with hot air before said fog is pumped into said downwell pipe.

13. The apparatus of claim 12 further comprising means for separating said chemicals from said oil recovered by said recovering means.

14. The apparatus of claim 13 wherein said means for detecting said temperature and pressure of said droplets comprises a pyrometer and a thermocouple.

15. The apparatus claimed in claim 13 wherein said controlled temperature of said droplets is between 500° F. and 2,500° F.

* * * * *